(12) United States Patent
Jones et al.

(10) Patent No.: US 10,795,694 B1
(45) Date of Patent: Oct. 6, 2020

(54) SYSTEM AND METHOD FOR AUTOMATING WORKFLOW APPLICATIONS UTILIZING ROUTES

(71) Applicant: Intuit Inc., Mountain View, CA (US)

(72) Inventors: Travis Jones, Tucson, AZ (US); Mark Sereno, Tucson, AZ (US); Kenneth Williams, Tucson, AZ (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/450,048

(22) Filed: Jun. 24, 2019

(51) Int. Cl.
  *G06F 9/445* (2018.01)

(52) U.S. Cl.
  CPC ................ *G06F 9/44521* (2013.01)

(58) Field of Classification Search
  CPC ............ G06F 11/3612; G06F 9/44526; G06F 9/44521
  USPC .................................................. 717/100–146
  See application file for complete search history.

(56) References Cited

U.S. PATENT DOCUMENTS

| | | | | |
|---|---|---|---|---|
| 7,013,289 B2* | 3/2006 | Horn | ............ | G06Q 10/087 705/14.51 |
| 7,111,282 B2* | 9/2006 | Stephenson | ......... | G06F 11/3612 714/E11.209 |
| 7,203,946 B2* | 4/2007 | Johnson | ................ | G06F 9/542 717/124 |
| 8,739,123 B2* | 5/2014 | Appleton | ............... | G06Q 30/02 717/120 |
| 9,189,355 B1* | 11/2015 | Moturu | ................ | G06F 11/301 |
| 10,120,734 B1* | 11/2018 | Doraiswamy | .......... | G06F 21/44 |
| 2002/0133805 A1* | 9/2002 | Pugh | ..................... | G06F 21/10 717/120 |
| 2003/0093772 A1* | 5/2003 | Stephenson | ......... | G06F 11/3612 717/130 |
| 2004/0148307 A1* | 7/2004 | Rempell | ............... | G06F 40/166 |
| 2008/0301643 A1* | 12/2008 | Appleton | ............... | G06Q 30/02 717/124 |
| 2015/0212814 A1* | 7/2015 | Fransen | ............. | G06F 11/3051 717/122 |

* cited by examiner

*Primary Examiner* — Marina Lee
(74) *Attorney, Agent, or Firm* — Paradice and Li LLP

(57) ABSTRACT

A method and system provides a data services application that is highly scalable and modifiable without great risk of damaging the application. The method and system stores in a routing library in accordance with a browserless runtime environment, a plurality of route files each defining a data communication route between a data services application and a data source. The method and system stores, in accordance with the browserless runtime environment, application source code for the data services application. The application source code includes a callout to each route file in the routing library. Routes can be added by adding a new route file to the routing library and by adding a single line of code to the source code of the application.

20 Claims, 6 Drawing Sheets

116 → 　　　　　　200

| Name | Date Modified | Type | Size |
|---|---|---|---|
| admin.js | 5/7/2019 2:24 PM | JScript Script File | 5 kb |
| Announcement.js | 5/7/2019 2:24 PM | JScript Script File | 4 kb |
| autoClear.js | 5/15/2019 11:57 AM | JScript Script File | 15 kb |
| autoDefcon.js | 5/7/2019 2:24 PM | JScript Script File | 18 kb |
| boUpdate.js | 5/7/2019 9:29 PM | JScript Script File | 6 kb |
| corpAuth.js | 5/6/2019 9:29 PM | JScript Script File | 6 KB |
| exceptionLog.js | 5/6/2019 2:24 PM | JScript Script File | 1 KB |
| hui.js | 5/6/2019 9:29 PM | JScript Script File | 1 KB |
| index.js | 5/7/2019 12:26 PM | JScript Script File | 1 KB |
| myUpdate.js | 5/7/2019 2:24 PM | JScript Script File | 17 KB |
| qbAuth.js | 5/6/2019 9:29 PM | JScript Script File | 6 KB |
| qbEdit.js | 5/7/2019 2:24 PM | JScript Script File | 6 KB |
| qbUpdate.js | 5/8/2019 12:25 PM | JScript Script File | 15 KB |
| qsUpdate.js | 5/30/2019 3:42 PM | JScript Script File | 16 KB |
| socket.js | 5/30/2019 9:32 PM | JScript Script File | 5 KB |
| sso.js | 5/7/2019 2:24 PM | JScript Script File | 3 KB |
| stUpdate.js | 5/7/2019 2:24 PM | JScript Script File | 4 KB |
| universalPayload.js | 5/7/2019 2:24 PM | JScript Script File | 8 KB |
| wqDetails.js | 5/7/2019 2:24 PM | JScript Script File | 5 KB |

136 { qbAuth.js, qbEdit.js, qbUpdate.js }

```
app.use('/', hui);
app.use('/v1', routes);
app.use('/sbgcc/v1', routes);
app.use('/sbgcc', hui);
app.use('/hui', hui);
app.use('/qbEdit', qbEdit.router);
app.use('/defcon', qbAuth.router);
app.use('/workgroup', myUpdate.router);
app.use('/announce', announcement.router);
app.use('/ocupancy', boUpdate.router);
app.use('/wgdetails', wgDetails.router);
app.use('/schedules', stUpdate.router);
app.use('/universalpayload', universalPayload.router);
app.use('/admin', admin.router);
```

SYSTEM AND METHOD FOR AUTOMATING WORKFLOW APPLICATIONS UTILIZING ROUTES

BACKGROUND

Millions of people utilize data management systems such as tax return preparation systems, bookkeeping systems, and budgeting systems as a convenient and readily accessible way to manage their personal data. In order to better service their customers, providers of data management systems typically provide various mechanisms to help answer any customer questions and resolve any customer issues. To this end, many data management systems include customer assistance applications that enable customer service managers and experts to manage the potentially large volume of customer assistance requests and resolve customer questions or concerns.

A typical customer assistance application gathers information, in the form of status data, indicating the number and type of customer requests and data regarding the status of agents and other resources needed to address the customer requests. Using currently available customer assistance applications this status data is then used to provide an accurate portrayal of the current state of customer assistance requests, the various agents and resources that have been allocated to address customer assistance requests, and agents and resources that are available for allocation to address customer assistance requests.

In traditional data management systems, operators of these internal customer assistance applications have needed to manually request the retrieval of the status data from the multiple sources each time the current status of the various customer assistance requests and resources is desired. Updating the status in this way is often a time-consuming process that must be frequently repeated throughout the day. Additionally, this status updating process is error-prone because if any source of status data is not accessed, or forgotten, the current status data may be inaccurate or, at best, incomplete.

Furthermore, the set of sources of status data is not necessarily static. Therefore, it is often necessary to add new sources or to revise how data is retrieved from current data sources. However, currently, in order to enable the customer assistance applications to retrieve information from new sources, or to revise how data is retrieved from current data sources, software developers typically need to access the source code of the customer assistance applications to make potentially significant additions or revisions for each data source. This is a very expensive process in terms of human and non-human resources. In addition, making substantive revisions to the source code carries great risk because if errors are made when revising or adding to the source code, then the entire application may become nonfunctional until the problem is resolved. When the internal customer assistance application becomes nonfunctional, operators and managers of the customer assistance service may not be able to obtain any information regarding the current state of customer assistance requests and resources. This can result in customers of the data management system not being able to receive prompt or efficient assistance until the problem is resolved.

The problems and issues set forth above in relation to internal customer assistance applications are not restricted to the field of customer assistance applications, or even to status data. In fact, the same issues arise in any situation where data is obtained from multiple sources and must be updated or synchronized. Accordingly, the problems and issues set forth above can occur in many kinds of software applications for data management systems.

What is needed is a method and system that provides a technical solution to the technical problem of effectively and efficiently gathering information for a software application from a variety of data sources while minimizing the risk of rendering the application nonfunctional when data sources are added or revised.

SUMMARY

Embodiments of the present disclosure allow a software application to obtain data from a variety of sources by implementing source code for the data application in a browserless runtime environment and by utilizing a routing library separate from the source code to define routes to collect data from data sources.

The routing library includes, for each data source, a respective routing file. Each routing file defines a route for retrieving information from that data source. The application gathers data from the various data sources by making a call to the various routing files from the routing library. Adding a new data source to the application includes adding a routing file to the routing library and adding a single line of code to the application source code calling out the new routing file.

Using the disclosed embodiments, data source routes can be added and revised without substantive adjustments to the source code of the application, and the associated risk of damaging the functionality of the application. This is because, according to the disclosed embodiments, a routing file can be created or revised within the routing library, and the callout to the routing file can be added to the application source code. In this way, embodiments of the present disclosure facilitate gathering data from various sources by adding routes to a routing library.

Embodiments of the present disclosure overcome many of the drawbacks of traditional processes for implementing applications for data management systems. A web-based application can be modified to adjust both functions and routes without making risky revisions to the source code of the application. The result is a web-based application that is dynamically modifiable and scalable without interrupting the functionality of the application.

BRIEF DESCRIPTION OF THE DRAWINGS

FIG. 2 is a view of a routing library including a plurality of routing files displayed on a graphical user interface (GUI), according to one embodiment.

FIG. 3 is a view of a portion of the application source code of the data services application, according to one embodiment.

Figure 1:
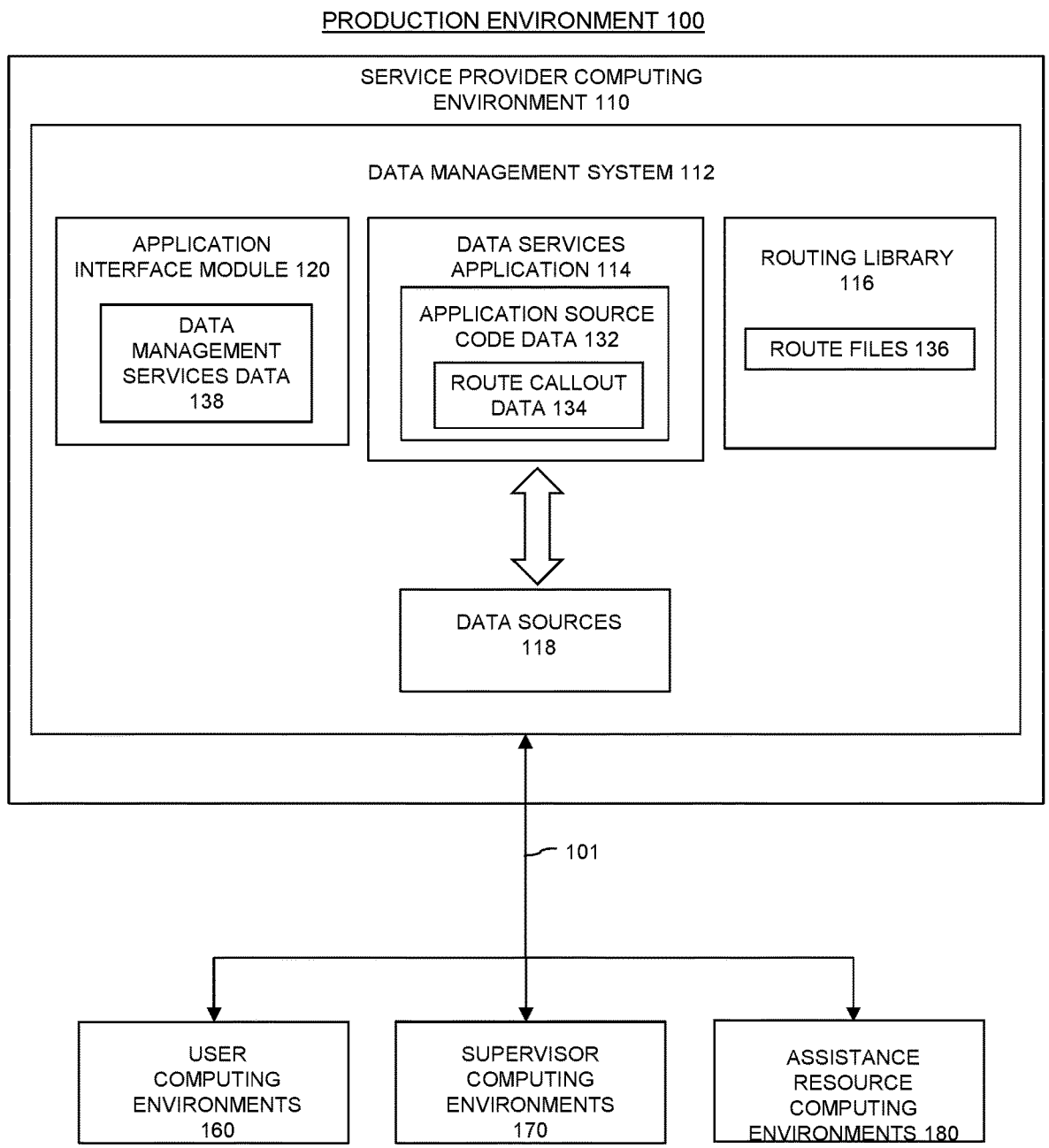
FIG. 1 is a block diagram of a system for connecting data sources to an application with reduced disruption to the application, in accordance with one embodiment.

Common reference numerals are used throughout the FIGs and the detailed description to indicate like elements. One skilled in the art will readily recognize that the above FIGs are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs, which depict one or more exemplary embodiments. Embodiments may be implemented in many different forms and should not be construed as limited to the embodiments set forth herein, shown in the FIGs, and described below. Rather, these exemplary embodiments are provided to allow a complete disclosure that conveys the principles of the invention, as set forth in the claims, to those of skill in the art.

Embodiments of the present disclosure utilize a browserless runtime environment to enable an application to interface with and pull data from various services and data sources. The application source code is implemented within a browserless runtime environment. The application utilizes a routing library provided in accordance with the browserless runtime environment to connect to and pull data from a plurality of data sources or services. The routing library includes, for each service, a respective routing file that defines a route for the service. The application source code includes a simple callout to each route. Therefore, adding a new data source to the application can be accomplished by adding a new routing file to the routing library and a simple callout to the new routing file within the source code of the application.

In one example, the application assists a customer service system of a data management system, such as a tax return preparation system. The customer service system can include multiple groups of customer support agents that communicate with users via phone, email, or an electronic text-based chat. The application automatically retrieves data related to how these customer support resources are being implemented. For example, the application automatically retrieves data from a plurality of systems that are each associated with a respective customer service group. This data can indicate how busy each group of support agents are. This can assist the customer service system to allocate customer support resources where they are most needed.

As set forth in more detail below, the application takes advantage of the structure of the browserless runtime environment to improve efficiency of the data collection processes. As set forth in more detail below, FIG. 1 illustrates a block diagram of a production environment 100 for connecting data sources to an application with reduced disruption to the application, according to one embodiment. The production environment 100 includes a service provider computing environment 110, user computing environments 160, supervisor computing environments 170, and assistance resource computing environments 180. The computing environments 110, 160, 170, and 180 are communicatively coupled to each other with one or more communication channels 101, according to one embodiment.

The service provider computing environment 110 includes a data management system 112. The data management system 112 is configured to provide data management services to users.

The data management system 112 can include one or more of a tax return preparation system, a bookkeeping system, a personal budgeting system, a financial transaction tracking system, or any other application as discussed herein and/or as known in the art. The data management system 112 can be a standalone system that provides data management services to users. Alternatively, the data management system 112 can be integrated into other software or service products provided by a service provider. Users access the data management system 112 in order to receive data management services.

In the following discussion of FIG. 1, reference will sometimes be made to an example embodiment in which the data management system 112 includes a customer service system and a data services application 114 that provides data related to the customer service system. However, principles of the present disclosure can extend to many other kinds of data services applications and data management systems.

As users utilize the services of the data management system 112, it is common that users will have questions or problems regarding some aspects of the data management system 112, or regarding laws or regulations related to the services of the data management system 112. Accordingly, the data management system 112 includes a customer support system. The customer support system enables users to contact the data management system 112 and speak or message with customer assistance resources associated with the data management system 112. The customer assistance resources can include customer assistance agents that have expertise regarding the data management system 112 and can assist users to resolve their concerns.

The user computing environments 160 enable users to interface with the data management system 112. Users can utilize the user computing environments 160 to connect with the data management system, to provide data to the data management system, and to receive data management services from the data management system 112. Users can also utilize the user computing environments 160 to contact a customer support system of the data management system 112. Alternatively, or additionally, users can utilize other devices or methods for contacting the customer support system of the data management system 112.

Supervisors of the customer support system can utilize the supervisor computing environments 170 in order to interface with the customer support system of the data management system 112. Supervisors of the customer support system can utilize the supervisor computing environments 170 to view data related to the customer support system and to manage aspects of the customer support system. The supervisor computing environments 170 are part of the service provider computing environment 110.

Assistance agents associated with the data management system 112 can utilize the assistance resource computing environments 180 to interface with the data management system 112 and to interface with the user computing environments 160. The assistance agents can provide customer support to the users of the data management system 112 via the assistance resource computing environments 180. Additionally, or alternatively, assistance agents can utilize other methods or devices for interfacing with the data management system 112 or providing assistance to users of the data management system 112. The assistance resource computing environments 180 are part of the service provider computing environment 110.

The data management system 112 includes a data services application 114, a routing library 116, data sources 118, and an application interface module 120, according to various embodiments. The data management system 112 utilizes the data services application 114, the routing library 116, the data sources 118, and the application interface module 120 to provide a data services application 114 that is highly scalable and can easily and quickly add, remove, or revise routes to the data sources or services, according to various embodiments.

The data services application 114 is an application that gathers data from a variety of data sources. The data services application formats the gathered data and outputs the gathered data. The data services application 114 outputs the gathered data in a way that enables supervisors of the data services application 114 to access the data and to take appropriate actions responsive to the gathered data.

Supervisors of the customer support system can access the data services application 114 via the Internet by going to a URL associated with the data services application 114. The supervisors can login to the data services application 114. Once the supervisors have been authenticated, the supervisors can access the customer support data that has been gathered by the data services application 114.

The data services application 114 is implemented in a browserless runtime environment. The browserless runtime environment enables runtime scripts which would typically only be executed in a browser, to be executed outside of the browser. This can enable the data services application 114 to be implemented in a scalable and efficient manner as will be set forth in further detail below.

The browserless runtime environment includes a browserless JavaScript based runtime environment. The browserless runtime environment includes Node.js. Node.js is an open source, cross-platform JavaScript runtime environment that executes JavaScript code outside of the browser. Alternatively, other browserless runtime environments can be utilized in accordance with principles of the present disclosure.

The data services application 114 gathers data from the data sources 118. The data sources 118 include sources of data related to various aspects of the data management system 112. The data services application 114 requests and receives data from the various data sources 118. The data services application 114 then formats and outputs the gathered data in a manner that enables supervisors of the data services application 114 to view and utilize the data.

In the example in which the data services application 114 is an application that gathers and presents data related to a customer support system, the data sources 118 include sources of data related to the customer support system. If the data management system 112 includes one or more of a tax return preparation system, a bookkeeping system, a personal budgeting system, and a financial transaction monitoring system, the data sources 118 can include data related to the systems. The data sources 118 can provide data related to current loads or queues for customer support services for the various systems associated with the data management system 112. Each system may include multiple data sources.

The data sources 118 can provide data related to the utilization of customer assistance resources. This data can indicate the systems to which customer assistance agents are currently assigned. This data can also indicate whether individual assistance agents, or groups of assistance agents, are available to be moved to systems that are currently experiencing heavy loads of customer support requests.

The data services application 114 includes application source code data 132. The application source code data 132 corresponds to the source code of the data services application 114. The source code of the data services application 114 can be written in a language associated with the browserless runtime environment. In an example in which the browserless runtime environment is a JavaScript based browserless runtime environment, the application source code data 132 can be written in JavaScript.

The data management system 112 utilizes the routing library 116 to supplement the data services application 114. The routing library 116 includes route files 136. Each route file from the route files 136 defines a route by which the data services application 114 can communicate with a respective data source from the data sources 118. Thus, for each data source 118 from which the data services application 114 will receive data, there is a corresponding route file in the routing library 116.

Each route file in the routing library 116 is written in a computer language associated with the browserless runtime environment. In an example in which the browserless runtime environment is a JavaScript based browserless runtime environment, the route files 136 are written in JavaScript. Alternatively, if the browserless runtime environments is associated with another runtime language, then the route files 136 can be written in that other runtime language.

Each route file defines the configuration and parameters of the route by which the data services application 114 communicates with the data sources 118. Each route file can include a continuous update loop that causes the data services application 114 to continuously call on and retrieve data from the corresponding data source. The continuous update loop can cause the data services application 114 to call on the corresponding data source with a periodicity defined in the route file. For example, the defined periodicity could be a selected number of seconds, a selected number of minutes, a selected number of hours, or a selected number of days.

The browserless runtime environment enables an application to interface with and pull data from various services. The application source code is implemented with the browserless runtime environment. The application utilizes a routing library provided in accordance with the browserless runtime environment to connect to and pull data from a plurality of services or data sources. The routing library includes, for each service, a respective routing file that defines a route for the service. The application source code includes a simple callout to each route. Therefore, adding a new service to the application can be accomplished by adding a new routing file to the routing library, and a simple callout to the new routing file within the source code of the application.

Each data source or service has a corresponding routing file in the routing library. The routing file defines the route by which the application connects to the data source or service. The routing file includes a configuration that enables the application to automatically and periodically make calls to the various data sources.

The application source code data 132 includes route callout data 134. The route callout data 134 includes a simple callout to each route file 136 in the routing library 116. The route callout can be as simple as a single line of code. Thus, a route is enabled by including a route file in the routing library 116, and the corresponding route callout in the application source code data 132.

Developers are able to add new routes, revise existing routes, or remove existing routes from the data services application 114 in a highly scalable manner with reduced risk of interrupting the functionality of the data services application 114. For example, if a new data source is to be added to the data services application 114, developers can write a corresponding routing file to be added to the routing library 116. When the routing file has been added to the routing library 116, developers can then make a simple adjustment to the application source code data 132 that includes a callout to the routing file. As noted above, in some cases, such an adjustment can include adding only a single line of code to the source code of the data services application 114. Adding a relatively short callout in the application source code minimizes the risk that functionality of the application can be broken when adding a new data source. Thus, adding data sources or services to an application can be done quickly and safely.

In contrast to the disclosed embodiments, in traditional applications, the source code of data services application includes the configuration for retrieving data from data sources or services. Thus, adding or removing a data source or service in traditional data services applications includes a high degree of risk due to the substantive revisions or additions that need to be made to the source code of the data services applications. The potential for making the data services applications nonfunctional by substantively revising the source code is very high.

However, in the data services application 114, data sources can be added, removed, and revised with very little risk to the functionality of the data services application 114. This is, in part, because when adding a new data source, the only revision that needs to made to the application source code data 132 is to add a simple callout to the route by which the data source will be called. When removing a data source, the corresponding route callout is removed from the application source code data 132. Thus, a data services application 114 in accordance with principles of the present disclosure can quickly add and remove data sources as needed with reduced risk to the functionality of the application.

In one example, the data management system 112 utilizes the browserless runtime environment routing library 116 to define routes for each data source or data service. The configuration file for each route defines the route for the data source and defines functionality that enables the data services application 114 to continuously retrieve data from the data source. A supervisor of the application can access a dashboard to see the status of the customer service system in terms of current load and available resources. Data sources can be quickly added or removed as needed by adding or removing a corresponding routing file to the route files 136 of the routing library 116 and by adding in the corresponding callout to the application source code.

Each routing file in the routing library 116 utilizes a common format or structure. This has the advantage of being able to quickly generate new routing files for the routing library 116 by making only a few revisions to the common format or template and saving it as a new routing file. This has the additional advantage of enabling services or data sources to communicate with each other because they have the same data structure. In this way, the data sources are, in essence, speaking the same language, due to the usage of the common format for the routing files. Thus, there is a comparatively small amount of retooling and adjustment needed when scaling services associated with the data services application 114 because the services use common functions in accordance with the common format for the routing files.

In addition to having a universal format that enables services to communicate with each other without reconfiguring them, the routing files share socket connections. A socket connection is a connection that enables a server associated with the data services application 114 to communicate with a web browser that accesses the application. Thus, when a supervisor logs into the dashboard associated with the application via a web browser, data is provided from the server to the web browser via the socket connection. When a service has a socket connection, the service can receive data from the client. The service can also push data to the client when the service has socket connection.

The data services application 114 blocks all routes by default until they are defined in the source code. If a new route is put in the routing library 116 the application will not call the route unless the callout line to the route is added to the source code for the route. Thus, once a route is defined in the routing library 116, the corresponding callout can be added to the source code of the application. Once the corresponding callout is added to the source code of the data services application 114, the data services application 114 will enable the route. If the callout is not in the application source code, the route is blocked by default.

The route file for a route defines what will be done for various requests. For example, the route file can define what will happen for requests like "get" and "post". The route file can define that "get" will retrieve data from a data source. The route file can define that "post" will post data to the dashboard of the application.

The route file for a data source can also define how data will be parsed and formatted when retrieved from the data source. For example, a route can define that data will be converted from a first format to a second format upon being retrieved from a data source. For example, a route can define that Extensible Machine Language (XML) data should be converted to JavaScript Object Notation (JSON). The route can also define how data will be pushed to the application or client through the web socket.

The routes enable services to gather data thru the use of web sockets. The application broadcasts a query to all routes for meta services. As a result, in order to implement a new service, a developer simply needs to add a new route file to route files 136 to interface with the new service, and the corresponding callout to the route is added to the application source code data 132. Accordingly, the application is easily scalable.

The data management system 112 includes the application interface module 120. The application interface module 120 outputs data management services data 138. When a supervisor logs into the data services application 114 to view data related to the data management system 112 gathered from the data sources 118, the data services application 114 outputs the data management services data 138 via the application interface module 120. The application interface module 120 is part of the data services application 114.

FIG. 2 is a view 200 of a routing library 116 including a plurality of route files 136 displayed on a graphical user interface (GUI), according to one embodiment. Each routing file defines a route by which data can be transferred between the data services application 114 and one of the data sources 118. The routing files can be generated utilizing one or more routing templates. This can ensure that the routes are compatible with each other, thereby enabling services to communicate with each other. In the example of FIG. 2, the route files are written in JavaScript in accordance with the browserless JavaScript runtime environment node.JS.

FIG. 3 is a view 300 of a portion of the application source code data 132 of the data services application 114, according to one embodiment. The view 300 identifies a plurality of route callouts. Each route callout calls out a route file from the routing library 116. In the view 300, the route callouts are each a single line of code. This illustrates the ease with which the application source code data 132 can be modified to add or remove routes in accordance with principles of the present disclosure. Individual lines of code can be added or removed without risk to the functionality of the data services application 114. In the example of FIG. 3, the application source code data 132 is written in JavaScript.

Figure 4:
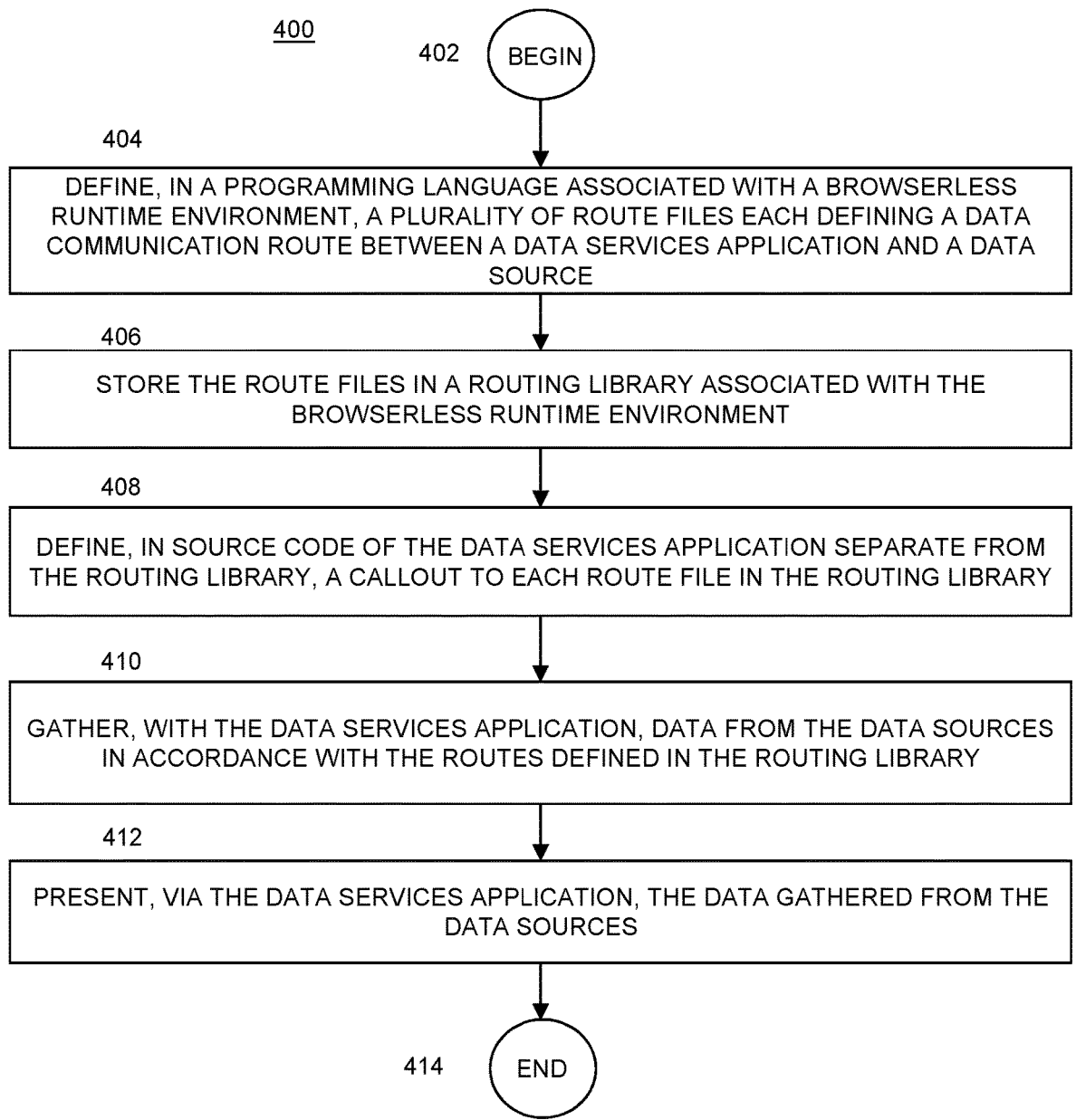
FIG. 4 is a flow diagram of a process for connecting data sources to an application with reduced disruption to the application, in accordance with one embodiment.

FIG. 4 illustrates a flow diagram of a process 400 for connecting data sources to an application with reduced disruption to the application, in various embodiments.

Referring to FIGS. 1-4, and the description of FIGS. 1-3 above, in one embodiment, process 400 begins at 402 and process flow proceeds to 404.

At 404, a plurality of route files are defined in a programming language associated with a browserless runtime environment, such as Java. Each route file includes software instructions that define a data communication route between a data services application and a data source, using any of the methods, processes, and procedures discussed above with respect to FIGS. 1-3.

Once the route files at 404, process flow proceeds to 406.

At 406, the route files are stored in a routing library associated with the browserless runtime environment, using any of the methods, processes, and procedures discussed above with respect to FIGS. 1-3.

Once the route files are stored in a routing library associated with the browserless runtime environment at 406, process flow proceeds to 408.

At 408, a callout to each route file in the routing library is defined in source code of the data services application separate from the routing library, using any of the methods, processes, and procedures discussed above with respect to FIGS. 1-3.

Once a callout to each route file in the routing library is defined in source code of the data services application separate from the routing library at 408, process flow proceeds to 410.

At 410, data from the data sources is gathered, with the data services application, in accordance with the routes defined in the routing library, using any of the methods, processes, and procedures discussed above with respect to FIGS. 1-3.

Once data from the data sources is gathered, with the data services application, in accordance with the routes defined in the routing library at 410, process flow proceeds to 412.

At 412, the data gathered from the data sources is presented via the data services application, using any of the methods, processes, and procedures discussed above with respect to FIGS. 1-3.

Once the data gathered from the data sources is presented via the data services application at 412, process flow proceeds to 414.

At 414 the process 400 for connecting data sources to an application with reduced disruption to the application is exited to await new data and/or instructions.

Figure 5:
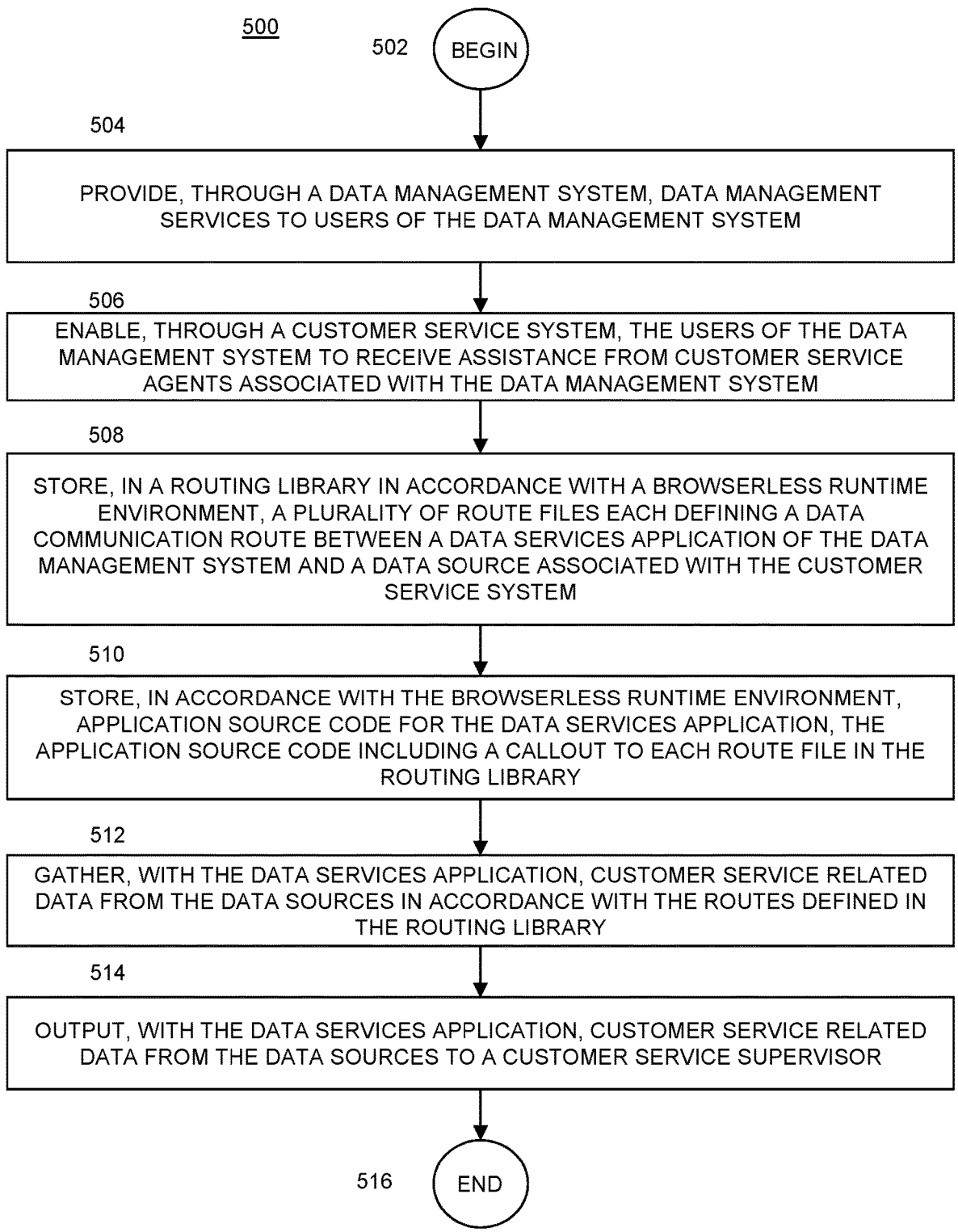
FIG. 5 is a flow diagram of a process for connecting data sources to an application with reduced disruption to the application, in accordance with one embodiment.

FIG. 5 illustrates a flow diagram of a process 500 for connecting data sources to an application with reduced disruption to the application, in various embodiments.

Referring to FIGS. 1-3, 5, and the description of FIGS. 1-3 above, process 500 begins at 502 and process flow proceeds to 504.

At 504, data management services are provided to users of a data management system, using any of the methods, processes, and procedures discussed above with respect to FIGS. 1-3.

Once data management services are provided to users of a data management system at 504 process flow proceeds to 506.

At 506, users of the data management system are enabled, through a customer service system, to receive assistance from customer service agents associated with the data management system, using any of the methods, processes, and procedures discussed above with respect to FIGS. 1-3.

Once users of the data management system are enabled, through a customer service system, to receive assistance from customer service agents associated with the data management system at 506, process flow proceeds to 508.

At 508, a plurality of route files are stored, in a routing library in accordance with a browserless runtime environment, each defining a data communication route between a data services application of the data management system and a data source associated with the customer service system, using any of the methods, processes, and procedures discussed above with respect to FIGS. 1-3.

Once a plurality of route files are stored, in a routing library in accordance with a browserless runtime environment, each defining a data communication route between a data services application of the data management system and a data source associated with the customer service system at 508, process flow proceeds to 510.

At 510, application source code for the data services application is stored, in accordance with the browserless runtime environment, the application source code including a callout to each route file in the routing library, using any of the methods, processes, and procedures discussed above with respect to FIGS. 1-3.

Once application source code for the data services application is stored, in accordance with the browserless runtime environment, the application source code including a callout to each route file in the routing library at 510, process flow proceeds to 512.

At 512, customer service related data from the data sources is gathered, with the data services application, in accordance with the routes defined in the routing library, using any of the methods, processes, and procedures discussed above with respect to FIGS. 1-3.

Once customer service related data from the data sources is gathered, with the data services application, in accordance with the routes defined in the routing library at 512, process flow proceeds to 514.

At 514, customer service related data is output, with the data services application, from the data sources to a customer service supervisor, using any of the methods, processes, and procedures discussed above with respect to FIGS. 1-3.

Once customer service related data is output, with the data services application, from the data sources to a customer service supervisor at 514, process flow proceeds to 516.

At 516 the process 500 for connecting data sources to an application with reduced disruption to the application is exited to await new data and/or instructions.

Figure 6:
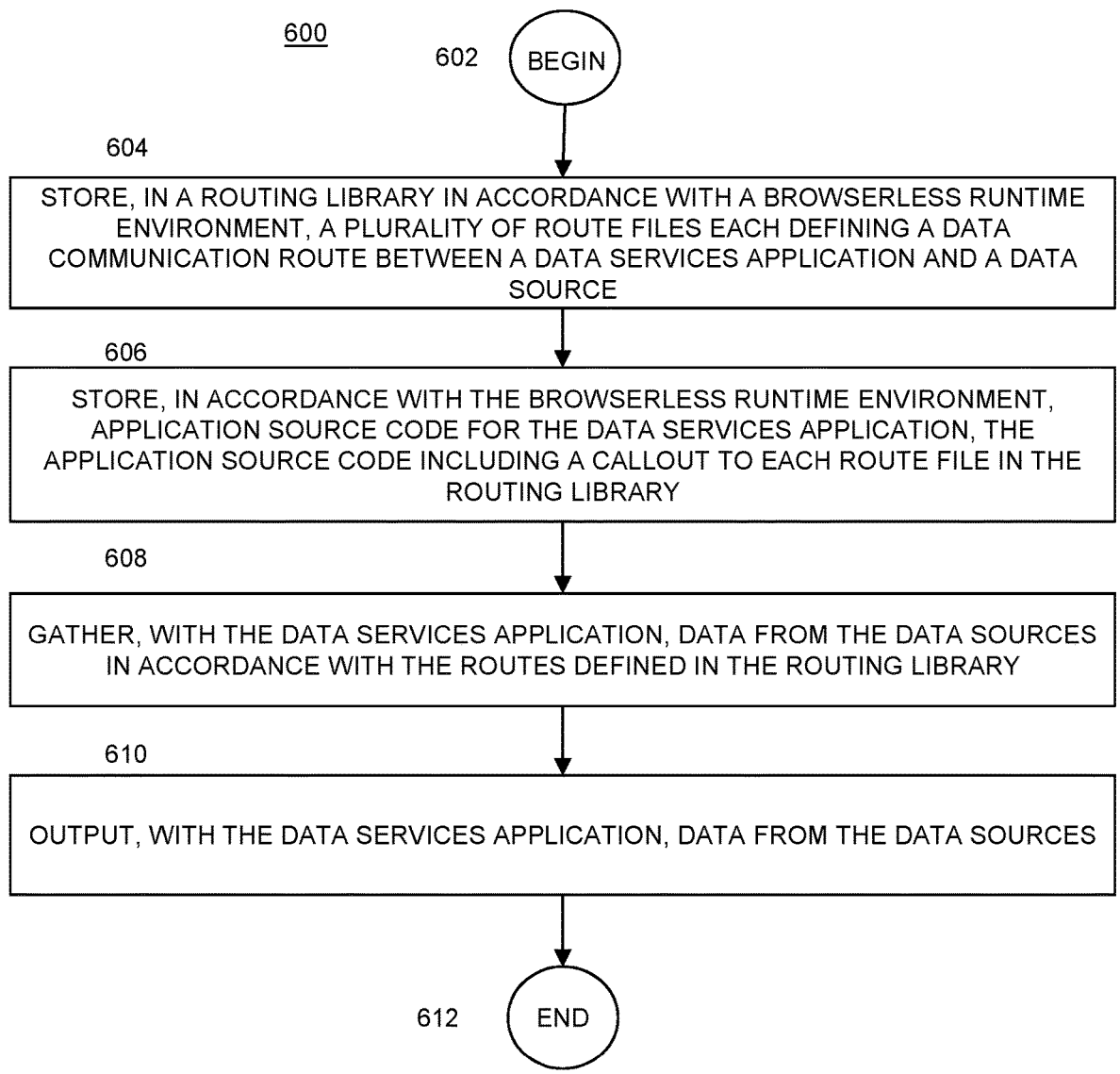
FIG. 6 is a flow diagram of a process for connecting data sources to an application with reduced disruption to the application, in accordance with one embodiment.

FIG. 6 illustrates a flow diagram of a process 600 for connecting data sources to an application with reduced disruption to the application, in various embodiments.

Referring to FIG. 6, FIGS. 1-3, and the description of FIGS. 1-3 above, process 600 begins at 602 and process flow proceeds to 604.

At 604, a plurality of route files are stored, in a routing library in accordance with a browserless runtime environment, each defining a data communication route between a data services application and a data source, using any of the methods, processes, and procedures discussed above with respect to FIGS. 1-3.

Once a plurality of route files are stored, in a routing library in accordance with a browserless runtime environment, each defining a data communication route between a data services application and a data source at 604 process flow proceeds to 606.

At 606, application source code for the data services application is stored, in accordance with the browserless runtime environment, the application source code including a callout to each route file in the routing library, using any of the methods, processes, and procedures discussed above with respect to FIGS. 1-3.

Once application source code for the data services application is stored, in accordance with the browserless runtime environment, the application source code including a callout to each route file in the routing library at 606, process flow proceeds to 608.

At 608, data from the data sources is gathered, with the data services application in accordance with the routes defined in the routing library, using any of the methods, processes, and procedures discussed above with respect to FIGS. 1-3.

Once data from the data sources is gathered, with the data services application in accordance with the routes defined in the routing library at 608, process flow proceeds to 610.

At 610, data from the data sources is output with the data services application, using any of the methods, processes, and procedures discussed above with respect to FIGS. 1-3.

Once data from the data sources is output with the data services application at 610, process flow proceeds to 612.

At 612 the process 600 for connecting data sources to an application with reduced disruption to the application is exited to await new data and/or instructions.

The disclosed method and system for connecting data sources to an application with reduced disruption to the application provide for the processing and storing of smaller amounts of data, i.e., by reducing the need for quality assurance and regression testing when adding data sources; thereby eliminating unnecessary data analysis and storage. Consequently, using the disclosed method and system for connecting data sources to an application with reduced disruption to the application results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for connecting data sources to an application with reduced disruption to the application.

As noted, the specific illustrative examples discussed above are but illustrative examples of implementations of embodiments of the method or process for connecting data sources to an application with reduced disruption to the application. Those of skill in the art will readily recognize that other implementations and embodiments are possible. Therefore, the discussion above should not be construed as a limitation on the claims provided below.

A method connects data sources to an application with reduced disruption to the application. The method includes storing, in a routing library in accordance with a browserless runtime environment, a plurality of route files each defining a data communication route between a data services application and a data source and storing, in accordance with the browserless runtime environment, application source code for the data services application. The application source code includes a callout to each route file in the routing library. The method includes gathering, with the data services application, data from the data sources in accordance with the routes defined in the routing library and outputting, with the data services application, data from the data sources.

A system for connecting data sources to an application with reduced disruption to the application includes at least one processor and at least one memory coupled to the at least one processor. The at least one memory having stored therein instructions which, when executed by any set of the one or more processors, perform a process. The process includes storing, in a routing library in accordance with a browserless runtime environment, a plurality of route files each defining a data communication route between a data services application and a data source and storing, in accordance with the browserless runtime environment, application source code for the data services application. The application source code includes a callout to each route file in the routing library. The process includes gathering, with the data services application, data from the data sources in accordance with the routes defined in the routing library and outputting, with the data services application, data from the data sources.

Embodiments of the present disclosure address some of the shortcomings associated with traditional processes for connecting applications to disparate data sources. A data management system in accordance with one or more embodiments provides a data services application that is scalable with little risk to damage the data services application. The various embodiments of the disclosure can be implemented to improve the technical fields of data processing, data management, data transmission, data analysis, and data collection. Therefore, the various described embodiments of the disclosure and their associated benefits amount to significantly more than an abstract idea.

Using the disclosed embodiments of a method and system for connecting data sources to an application with reduced disruption to the application, a method and system for connecting data sources to an application with reduced disruption to the application more accurately is provided. Therefore, the disclosed embodiments provide a technical solution to the long-standing technical problem of data service applications that are not easily scalable.

The result is a much more accurate, adaptable, and robust method and system for connecting data sources to an application with reduced disruption to the application. This, in turn, results in: less human and processor resources being dedicated to quality assurance because more accurate and efficient methods can be implemented, i.e., less time required for analysis by humans, usage of fewer processing resources, usage of fewer memory storage assets, and less communication bandwidth being utilized to transmit data for analysis.

The disclosed method and system for connecting data sources to an application with reduced disruption to the application does not encompass, embody, or preclude other forms of innovation in the area of data management systems. In addition, the disclosed method and system for connecting data sources to an application with reduced disruption to the application is not related to any fundamental economic practice, fundamental data processing practice, mental steps, or pen and paper-based solutions, and is, in fact, directed to providing solutions to new and existing problems associated with data management systems. Consequently, the disclosed method and system for connecting data sources to an application with reduced disruption to the application, does not encompass, and is not merely, an abstract idea or concept.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for connecting data sources to an application with reduced disruption to the application, the method comprising:
    storing, in a routing library in accordance with a browserless runtime environment, a plurality of route files each defining a data communication route between a data services application and a data source;
    storing, in accordance with the browserless runtime environment, application source code for the data services application, the application source code including a callout to each route file in the routing library;
    gathering, with the data services application, data from the data sources in accordance with the routes defined in the routing library; and
    outputting, with the data services application, data from the data sources.

2. The method of claim 1, wherein one or more of the route files includes an update loop that causes the application to automatically make a call to the data source associated with the route file, wherein the update loop defines a periodicity with which the data services application will make calls to the data source.

3. The method of claim 1, wherein the data services application is configured to refrain from making calls via a route defined in a route file if the application source code does not include a callout to the route file.

4. The method of claim 1, wherein one or more of the data sources is connected to the data services application via a web-socket as defined by the corresponding route file.

5. The method of claim 1, wherein the browserless runtime environment is a JavaScript based browserless run time environment, wherein the browserless runtime environment includes node.JS.

6. The method of claim 1, further comprising generating the route files from a route file template that ensures compatibility between services that utilize the routes.

7. The method of claim 1, further comprising removing a data source from the data services application by deleting, from the application source code, the callout to the corresponding route file.

8. The method of claim 1, further comprising revising how data is collected from one of the data sources by revising the corresponding route file without revising the corresponding callout from the source code.

9. A method for connecting data sources to an application with reduced disruption to the application, the method comprising:
    providing, through a data management system, data management services to users of the data management system;
    enable, through a customer service system, the users of the data management system to receive assistance from customer service agents associated with the data management system;
    storing, in a routing library in accordance with a browserless runtime environment, a plurality of route files each defining a data communication route between a data services application of the data management system and a data source associated with the customer service system;
    storing, in accordance with the browserless runtime environment, application source code for the data services application, the application source code including a callout to each route file in the routing library;
    gathering, with the data services application, customer service related data from the data sources in accordance with the routes defined in the routing library; and
    outputting, with the data services application, customer service related data from the data sources to a customer service supervisor.

10. The method of claim 9, wherein the data services application is a customer service resource management application that enables supervisors of a customer service system to identify customer service loads and availability of customer service agents.

11. The method of claim 9, further comprising converting, with the data services application, the customer service related data from a first format to a second format prior to outputting the customer service related data to the customer service supervisor.

12. The method of claim 9, wherein the first format is extensible markup language and the second format is JavaScript Object Notation.

13. The method of claim 9, further comprising logging the customer service supervisor into the data services application via a route defined in the routing library.

14. A system for connecting data sources to an application with reduced disruption to the application, the system comprising:
    at least one processor; and
    at least one memory coupled to the at least one processor, the at least one memory having stored therein instructions which, when executed by any set of the one or more processors, perform a process including:
    defining, in a programming language associated with a browserless runtime environment, a plurality of route files each defining a data communication route between a data services application and a data source;
    storing the route files in a routing library associated with the browserless runtime environment;
    defining, in source code of the data services application separate from the routing library, a callout to each route file in the routing library;
    gathering, with the data services application, data from the data sources in accordance with the routes defined in the routing library; and
    presenting, via the data services application, the data gathered from the data sources.

15. The system of claim 14, wherein the process further includes generating the route files from a route file template that ensures compatibility between services that utilize the routes.

16. The system of claim 14, wherein the process further includes removing a data source from the data services application by deleting, from the application source code, the callout to the corresponding route file.

17. The method of claim 14, wherein the process further includes revising how data is collected from one of the data sources by revising the corresponding route file without revising the corresponding callout from the source code.

18. The system of claim 14, wherein the programming language includes JavaScript, and wherein the browserless runtime environment includes node JS.

19. The system of claim 14, wherein the data services application is a customer assistance resource management application.

20. The system of claim 14, wherein the process includes generating the route files from a route file template that ensures compatibility between services that utilize the routes.

* * * * *